United States Patent [19]

Foot

[11] Patent Number: 5,004,062
[45] Date of Patent: Apr. 2, 1991

[54] VEHICLE NOSE PIVOTAL HINGE ASSEMBLY

[75] Inventor: John Foot, Fremont, Calif.

[73] Assignee: Paccar Inc., Bellevue, Wash.

[21] Appl. No.: 244,722

[22] Filed: Sep. 14, 1988

[51] Int. Cl.$^5$ .............................................. E05D 7/10
[52] U.S. Cl. .................................. 180/69.21; 16/261; 296/190
[58] Field of Search ................... 296/190; 16/261, 263, 16/270–273, 360, 361; 180/69.21, 89.19; 49/388

[56] References Cited

U.S. PATENT DOCUMENTS

| | | | |
|---|---|---|---|
| 3,455,059 | 7/1969 | Evans | 16/263 X |
| 4,488,613 | 12/1984 | Marjoram | 296/190 X |
| 4,805,264 | 2/1989 | Benning et al. | 180/69.21 X |

FOREIGN PATENT DOCUMENTS

| | | | |
|---|---|---|---|
| 515329 | 8/1954 | Belgium | 16/270 |
| 1480425 | 6/1969 | Fed. Rep. of Germany | 180/69.21 |
| 1555123 | 11/1970 | Fed. Rep. of Germany | 16/261 |
| 1302645 | 7/1962 | France | 180/69.21 |

Primary Examiner—Margaret A. Focarino
Assistant Examiner—Joseph D. Pape
Attorney, Agent, or Firm—Flehr, Hohbach, Test, Albritton & Herbert

[57] ABSTRACT

A cabover truck or similar vehicle having a cab section and a movable frontal nose for gaining access into the cab section, wherein the nose is connected to the cab by a hinge assembly which allows the nose to be supported, and pivotally move between its closed and opened positions, while unfastened. The hinge assembly is located on the interior side of the nose but is accessible from outside the cab section when the nose is in its opened position.

1 Claim, 4 Drawing Sheets

FIG. — 1

VEHICLE NOSE PIVOTAL HINGE ASSEMBLY

THE TECHNICAL FIELD

In general the present invention relates to an improvement in the frontal nose section of a vehicle cab and, more particularly to the hinge assembly employed for pivotally connecting the nose section to the cab section of a large truck.

BACKGROUND OF THE INVENTION

Currently, during the assembly process of a vehicle such as a motorized vehicle and specifically a large truck, the nose section which is both heavy and bulky must be connected to the truck's cab section. Hinges are typically employed to connect the nose to the cab. Unfortunately, this assembly procedure is difficult and time-consuming because the nose must be supported while the hinges are fastened in place. In other words, while the entire nose must be supported, in a very exacting position, so that the hinge may be finally connected to both the nose and cab. This type of assembly also requires that the hinges be located on the outside of the cab and nose. "Supporting Two Members Together" issued to Jeffrey E. Kearney. While the hinge disclosed in the Kearney patent is satisfactory for many applications, it has been found to be highly desirable to provide a hinge assembly capable of being installed easily and quickly to the cab in a way which does not require that the nose be supported by external means during the assembly process.

Accordingly it is an object of the invention to provide a hinge assembly which will allow the nose to be installed easily and quickly to the cab.

It is another object of the invention to provide a hinge assembly which will allow the nose to be pivotally mounted for movement between its closed and opened positions from outside the cab and without first completely securing the hinge assembly, whereby the hinge assembly can be releasably secured with the nose in its pivotally opened position and whereby external support means are unnecessary during the initial attachment procedure.

It is still another object of the invention to provide a hinge assembly which will attach the nose securely to the cab with a release mechanism located within the nose when the latter is in its closed position.

It is a further object of the invention to provide an assembly, consistent with the foregoing objects, which is durable, compact (in that it will not interfere with the normal movement of the nose), easy to install and maintain, and is economical to manufacture.

SUMMARY OF THE INVENTION

The vehicle nose hinge assembly of the present invention allows the nose section of a vehicle, and particularly of a large truck, to be joined to and supported by the cab section of the truck in an unfastened or unsecured condition. This assembly, in its unfastened or unsecured state, also allows the nose to pivotally move between its closed and opened positions. The hinge parts are located on the interior side of the nose and are accessible from outside the cab section only when the nose is in an opened position and thus can only be secured together when the nose is in its opened position. The hinge assembly comprises, briefly, a pivot bolt connected to the cab section, a bushing block, mounted to said nose, which includes a groove for receiving said pivot bolt and means for securing the two together.

DETAILED DESCRIPTION OF THE INVENTION

Figure 1:
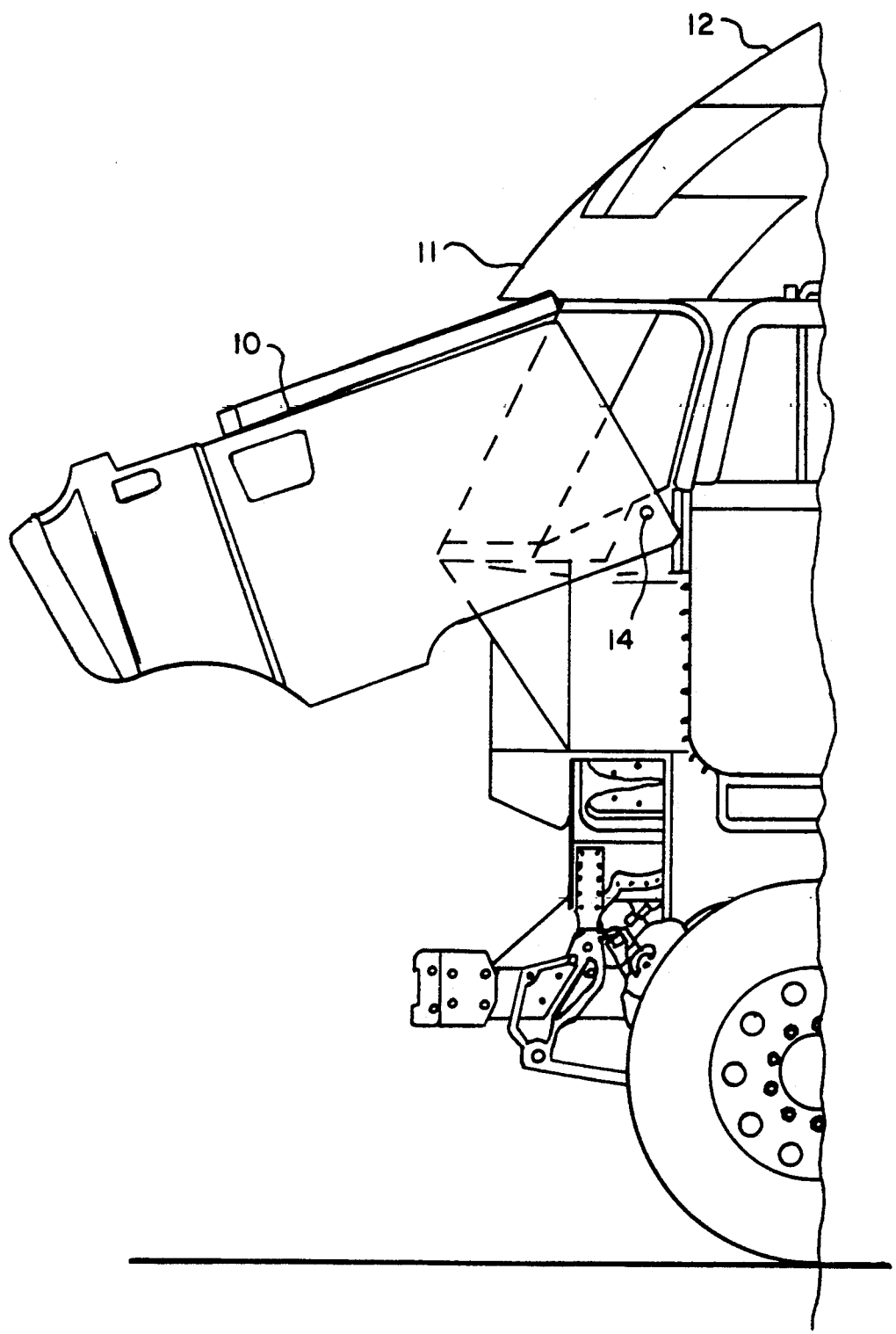
FIG. 1 is an overall external view of the truck cab with its nose in an open position.

Turning now to the drawings, wherein like components are designated by like referenced numerals throughout the various drawings, attention is directed to FIG. 1 which illustrates a truck nose section 10 forming part of a cab-over-engine (COE) type truck 12 including a frontal cab section 11. The cab section 11 supports two horizontally extending, axially aligned and confronting pivot bolts 14 which are fastened to its front sides.

Pivot bolts 14 which form parts of hinge assembly (to be described) support nose 10 during assembly so that external support means are unnecessary while the hinge assembly are fastened. Moreover, nose 10 rotates between its closed and open position employing bolts 14 as pivots in allowing nose 10 to rotate, without having to first secure the assembly, as will be seen.

Figure 2:
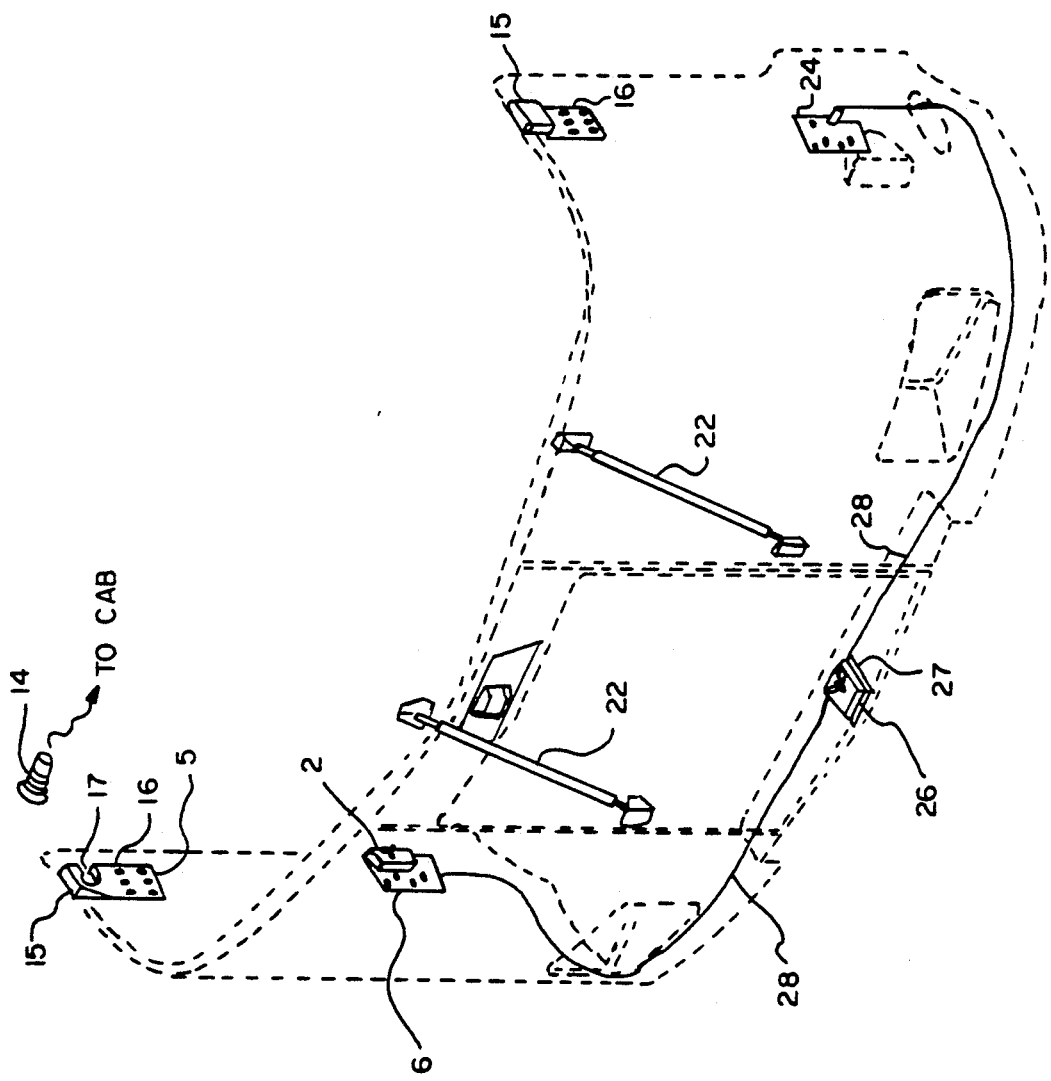
FIG. 2 is an external view of the nose section with a hinge assembly designed in accordance with the present invention and shown on the inner side.
Figure 3:
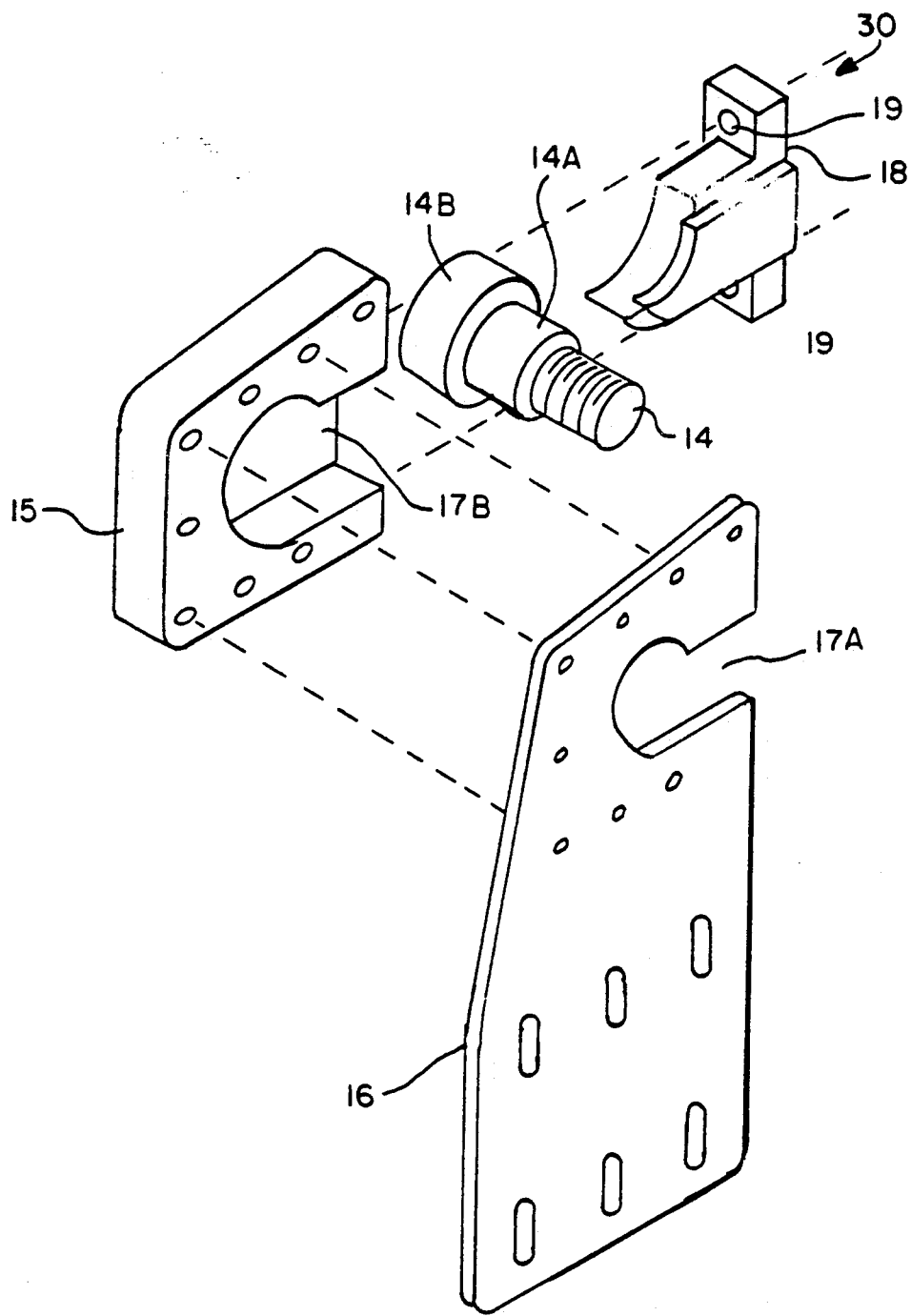
FIG. 3 is an exploded view of the preferred embodiment of the hinge assembly.
Figure 4:
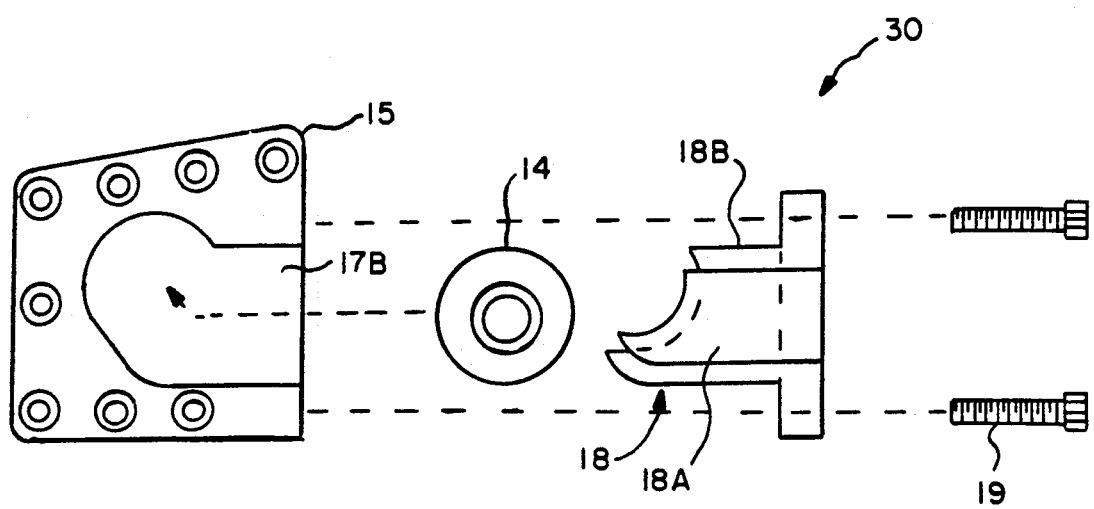
FIG. 4 is an exploded side view of the hinge assembly.
Figure 5:
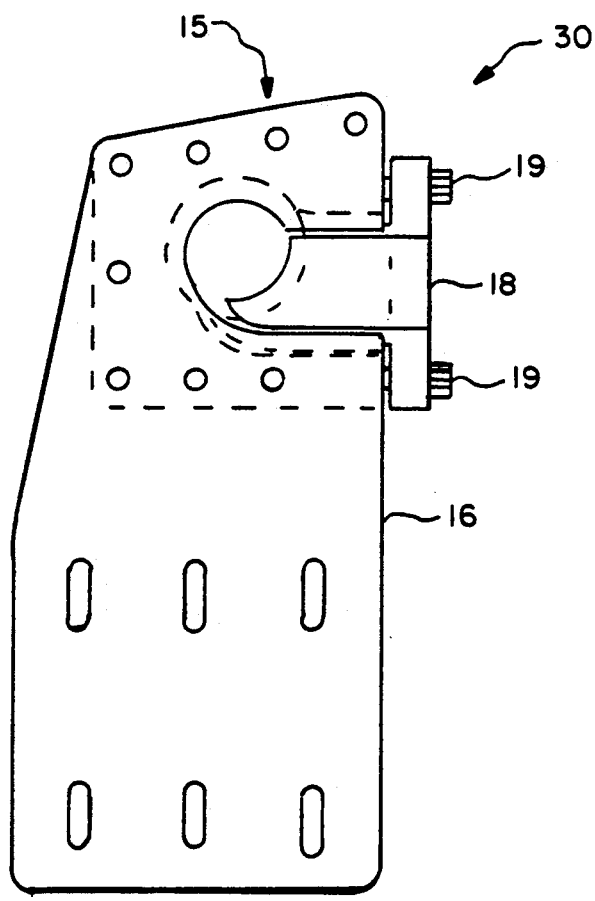
FIG. 5 is a side view of the hinge assembly in fastened form.

The truck nose, set forth in drawing FIG. 2, shows one of the pivot bolts 14 and certain components connected to nose 10 which allow the nose to pivot on bolt 14 and which along with the bolt form part of an overall hinge assembly 30 shown in FIGS. 3-5. Specifically, the components of the hinge assembly attached to nose 10 include bushing block 15 as well as bushing plate 16. Both bushing block 15 and bushing plate 16 contain a corresponding groove 17 in order to receive pivot bolt 14.

FIG. 3, which is an exploded view of one of the hinge assembly 30, shows that the bolt 14 has two outer annular sections 14A and 14B with the outermost section 14B being larger that inner annular section 14A. Moreover, FIG. 3 shows that groove 17 is in reality two corresponding grooves 17A and 17B. Groove 17A, located in bushing plate 16, includes an entry portion which corresponds in width to the diameter of inner annular portion annular 14A of pivot bolt 14. Groove 17B, located in bushing block 15 includes an entry portion that corresponds in width to the diameter of the larger annular portion 14B of pivot bolt 14. Thus, bushing plate groove 17A, while corresponding to, is slightly smaller than bushing block groove 17B. Bushing plate groove 17A prevents bolt 14 from moving axially out of bushing block groove 17B. Both grooves 17A and 17B include vertically raised or upwardly angled hanging portions.

Nose 10 is initially mounted to cab section 11 for unsecured pivotal movement by positioning annular sections 14A and 14B of each bolt into the angled hanging portions of their corresponding grooves 17A and 17B, respectively. This locks the bolts in place axially because the annular section 14B of each bolt is larger in diameter than adjacent groove 17A. At the same time, the nose is free to pivot between its opened and closed positions even though the entry portions of grooves 17A and 17B are open (unsecured).

Nose 10 may swing to an open position, by pivoting on bolt 14, so that a segment 18, generally configured as a plug and forming part of the overall pivot assembly, can be partially inserted within groove 17 so that pivot bolt 14 may be secured in place within the grooves 17A and 17B.

FIGS. 4 and 5 better display the actual configuration of grooves 17A and B which, as stated above, include horizontal entry portions leading into upwardly angled hanging portions. These figures also show how plug 18 includes a segment 18B configured to extend partially within groove 17B in order to fasten portion 14B of bolt 14 within its upwardly angled portion. Plug 18 also includes a segment 18A configured to extend partially into groove 17A in order to fasten portion 14A of bolt 14 within its upwardly angled portion. Plug 18 is fastened to bushing block 15 by screws 19, thereby securing pivot bolt 14 in place.

Returning to FIG. 3 in conjunction with FIGS. 4 and 5, the plug 18 is shown configured not only to extend within groove 17 to lock the bolt 14 within the grooves 17A and 17B, but also the way it conforms to segments of bolt sections 18A and 18B to thereby form a circular opening surrounding sections 14A and 14B of bolt 14. By forming this opening around the bolt, the nose hood is allowed to pivot freely between its opened and closed positions while the bolt remains secured in place.

FIG. 4 shows how bolt 14 is received by groove 17B in bushing block 15 during assembly. Specifically, as the nose section 10 is hung onto cab 11 from outside the cab, bolt 14 enters the horizontal entry section of groove 17 wherein gravity (the weight of nose section 10) forces bolt 14 into the upwardly angled hanging section of groove 17. Bolt 14 remains in the upwardly angled section while the nose is pivotally rotated to its opened position so that plug 18 may be inserted into groove 17 and fastened to bushing block 15, thereby clamping bolt 14 in place within the upward portion of groove 17.

Turning to the actual assembly of connecting the nose to the cab attention is directed again to FIG. 2. The nose 10 is preassembled with bushing block 15 and bushing plate 16 connected to the inner side thereof. Both bushing parts are slotted to allow for adjustment. Similarly, pivot bolt 14 is pre-fastened by inner threads to truck cab 11 such that the two non-threaded exterior annular portions 14A and 14B are protruding from said cab. The grooves 17B and 17A contained respectively within the bushing block 15 and bushing plate 16 are engaged with pivotal bolt 14 by external forces lifting the nose 10 into a position which allows for such interaction, as described above.

Upon engagement pivot bolt 14 enters the horizontal section of the groove and then proceeds by gravity into an upwardly-angled section extending from said horizontal section. Nose 10 may then be swung open, about pivot bolt 14, where it remain in an open position by way of gas springs 22. It is in this open position that plugs 18 may be inserted into and connected to bushing blocks 15 by screws 19.

Closing nose 10 requires pulling down on it to overcome the counterbalance of springs 22. Two rotary latches 24, located at the bottom of both sides of nose 10, grasp onto cab mounted striker bolts (not shown) upon closing. A paddle handle 26 mounted on a bottom center flange 27 of nose 10 opens latches 24 and continues to act as a handle for pulling nose 10 open. A cable 28 is routed around the inside curvature of nose 10 to connect the paddle handle 26 to the latches 24.

The foregoing has been a description of a preferred embodiment. It is to be understood that the exact configuration of the pivot bolt 14, bushing bracket 15, bushing plate 16 and plug 18 may vary in accordance with the present invention so long as they operate according to the parameters discussed above.

Also, while preferred it is not necessary to have two separate means such as 15 and 16. For example, it is possible to employ a single means on the inner side of nose 10 which will operate according to the parameters discussed above.

I claim:

1. In a vehicle having a cab section and a frontal nose for gaining access into the cab section, the improvement comprising two hinge assemblies on opposite sides of said cab section for pivotally connecting said nose to said cab section for movement of the nose between a closed position and an opened position, each of said hinge assemblies including:
   (a) a pivot bolt extending out from one side of said cab section and including two axially extending annular surfaces, one of which is closest to said cab section and a second annular surface which is larger in diameter than the first inner annular surface;
   (b) a bushing block including a groove for receiving the larger of said annular surfaces, said groove, including a horizontal section having an entry, and an upwardly angled section extending from said horizontal section;
   (c) a bushing plate having a groove corresponding to the bushing plate groove yet smaller so that it receives the inner, smaller annular surface of said bolt while retaining the outer larger annular section of the groove within the bushing block groove; and
   (d) a fastening means including a segment configured to extend partially within said bushing block groove including a surface of complimentary shape to engage the bolt therein in order to fasten said bolt within the groove and serve as a bearing surface for said bolt.

* * * * *